US008359899B2

(12) United States Patent
Graupner et al.

(10) Patent No.: US 8,359,899 B2
(45) Date of Patent: Jan. 29, 2013

(54) METHOD FOR CORRECTING THE OUTPUT SIGNAL OF A LAMBDA PROBE

(75) Inventors: Olaf Graupner, Köfering (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 800 days.

(21) Appl. No.: 12/282,557

(22) PCT Filed: Feb. 2, 2007

(86) PCT No.: PCT/EP2007/051009
§ 371 (c)(1), (2), (4) Date: Oct. 28, 2008

(87) PCT Pub. No.: WO2007/104610
PCT Pub. Date: Sep. 20, 2007

(65) Prior Publication Data

US 2009/0095049 A1 Apr. 16, 2009

(30) Foreign Application Priority Data

Mar. 14, 2006 (DE) ......................... 10 2006 011 722

(51) Int. Cl.
*G01M 15/10* (2006.01)
*G01N 27/417* (2006.01)
*F02D 41/00* (2006.01)

(52) U.S. Cl. .......................................... 73/1.06; 73/1.07

(58) Field of Classification Search ........................ None
See application file for complete search history.

(56) References Cited

U.S. PATENT DOCUMENTS 5,934,230 A * 8/1999 Uytdewilligen et al. ... 123/73 R
6,279,372 B1 8/2001 Zhang ............................ 73/1.07
6,820,461 B2 11/2004 Sarholz et al. ............... 73/23.31
6,872,071 B1 * 3/2005 Durst .............................. 431/90
6,882,929 B2 4/2005 Liang et al. .................... 701/115
7,959,777 B2 * 6/2011 Scheffler .................. 73/23.21 X
2012/0055457 A1 * 3/2012 Wong et al. ............... 702/100 X

FOREIGN PATENT DOCUMENTS

DE 3525115 A1 * 1/1987 .................. 73/23.21
DE 19924284 12/1999
DE 19842425 3/2000
GB 2341687 3/2000
JP 04301736 A * 10/1992 ..................... 73/1.06

OTHER PUBLICATIONS

International Search Report and Written Opinion; PCT/EP2007/051009; pp. 10, May 22, 2007.

* cited by examiner

*Primary Examiner* — Thomas P Noland
(74) *Attorney, Agent, or Firm* — King & Spalding L.L.P.

(57) ABSTRACT

In a method for correcting the output signal of a broadband lambda probe of an internal combustion engine, the influence of the air humidity on the lambda value determined by the broadband lambda probe is detected and is deducted by means of a compensation model. For this purpose, a measured air humidity is incorporated in the calibration of the broadband lambda probe during an overrun shut-off phase of the internal combustion engine.

10 Claims, 2 Drawing Sheets

METHOD FOR CORRECTING THE OUTPUT SIGNAL OF A LAMBDA PROBE

CROSS-REFERENCE TO RELATED APPLICATIONS

This application is a U.S. national stage application of International Application No. PCT/EP2007/051009 filed Feb. 2, 2007, which designates the United States of America, and claims priority to German application number 10 2006 011 722.0 filed Mar. 14, 2006, the contents of which are hereby incorporated by reference in their entirety.

TECHNICAL FIELD

The present invention relates to a method for correcting the output signal of a lambda probe, in particular taking into account the humidity of the air aspirated by an internal combustion engine.

BACKGROUND

The requirements facing today's internal combustion engines are increasing all the time. This applies both to internal combustion engines that operate with diesel fuel and to those that are powered by gasoline or other fuels. In addition to steadily increasing performance, a progressive reduction in harmful exhaust emissions is also demanded of the internal combustion engine.

Harmful exhaust gas emissions are reduced with the aid of low emission concepts. Technically these are based on the use of catalytic converters and broadband lambda probes, for example. However, the output signal of broadband lambda probes is subject to inaccuracies. In order to effectively compensate for said inaccuracies and to calibrate the broadband lambda probe used, DE-A-198 42 425 C2 discloses a method for correcting the characteristic curve of the lambda probe. Said correction or adjustment of the broadband lambda probe is performed during an overrun fuel cut-off phase of the internal combustion engine, i.e. without injection of fuel. This means that during said overrun fuel cut-off phase the value measured by the broadband lambda probe can be compared with the reference value for clean air. A calibration factor is determined in order to calibrate the measured value to the reference value for clean air. Owing to the simplicity and reliability of the method of DE-A-198 42 425 C2 it is employed in mass-produced motor vehicles.

It is however disadvantageous that with the method described by DE-A-198 42 425 C2 an influence of the humidity of the aspirated air of the internal combustion engine fails to be taken into account. According to manufacturer specifications of the broadband lambda probe, when saturated air at 30° C. is aspirated, for example, an inaccuracy of more than 4% is caused by the influence of the humidity of the air. This tolerance has a significant effect on the emissions of the internal combustion engine and consequently needs to be reduced.

SUMMARY

According to an embodiment, a method for correcting the output signal of a broadband lambda probe of an internal combustion engine, may comprise the following steps: a) Detecting an overrun fuel cut-off phase of the internal combustion engine and measuring of an exhaust gas composition with the aid of the broadband lambda probe such that the broadband lambda probe can be calibrated to a known exhaust gas composition, b) measuring the humidity of the ambient air of the internal combustion engine, and c) calculating a calibration factor of the broadband lambda probe taking into account the known exhaust gas composition and the measured air humidity.

According to a further embodiment, the method may comprise the further step of: Describing of a sensitivity of the broadband lambda probe to the air humidity by means of an air humidity factor and incorporating the air humidity factor into the calibration factor. According to a further embodiment, the method may comprise the further step of: Measuring the air humidity by way of an air humidity sensor, in particular in an air intake duct or an air conditioning system of the internal combustion engine. According to a further embodiment, the method may comprise the further step of: Applying an air humidity factor in accordance with manufacturer specifications for the broadband lambda probe or determining a dependence of a measurement behavior of the broadband lambda probe with selective modification of the air humidity.

BRIEF DESCRIPTION OF THE DRAWINGS

The invention will now be more particularly described by way of example with reference to the accompanying drawings. Novel features believed characteristic of the inventions are set forth in the claims. The inventions themselves, as well as the preferred mode of use, further objectives, and advantages thereof, are best understood by reference to the following detailed description of the embodiment in conjunction with the accompanying drawings, in which:

DETAILED DESCRIPTION

The aforesaid method for correcting the output signal of a broadband lambda probe of an internal combustion engine comprises the following steps: a) detection of an overrun fuel cut-off phase of the internal combustion engine and measurement of an exhaust gas composition with the aid of the broadband lambda probe in the overrun fuel cut-off phase such that the broadband lambda probe can be calibrated to a known exhaust gas composition, b) measurement of the humidity of air aspirated by the internal combustion engine, and c) calculation of a calibration factor of a characteristic curve of the broadband lambda probe taking into account the measured exhaust gas composition and the measured air humidity.

By comparison with the prior art, use is made of the knowledge that the humidity contained in the aspirated air of an internal combustion engine causes variations in the determination of the exhaust gas composition by means of a broadband lambda probe. These variations are so great that they must not be ignored in order to fulfill low emission concepts of contemporary internal combustion engines and motor vehicles. For this reason the method known from DE-A-198 42 425 C2 for correcting the characteristic curve of the broadband lambda probe is extended by a correction that takes into account the air humidity. This is because formerly the effect of the air humidity on the operation of the broadband lambda probe was ignored.

Figure 1:
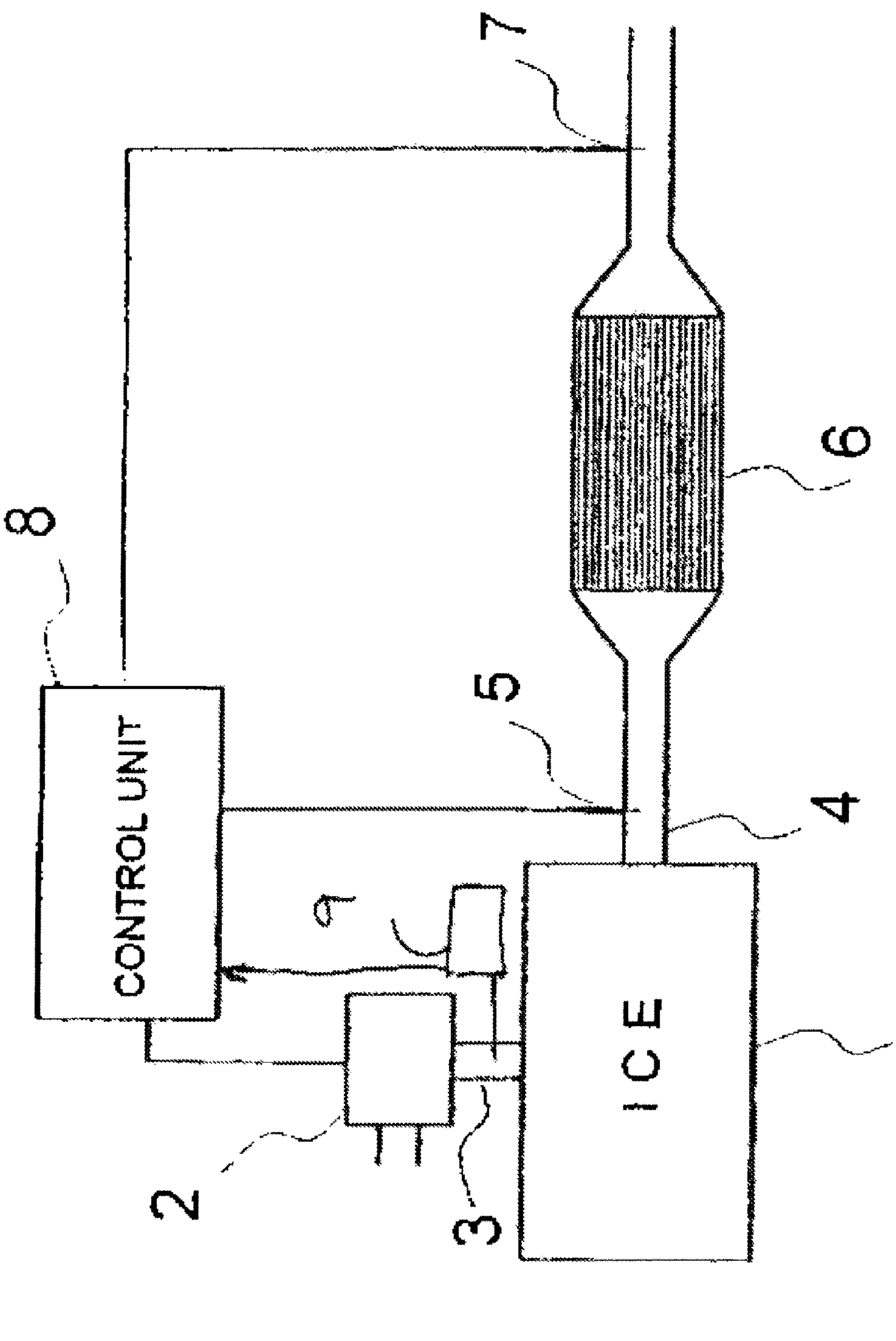
FIG. 1 is a diagram of an internal combustion engine in accordance with embodiments of the present invention.

As shown in FIG. 1, the operation of an internal combustion engine 1 is controlled by an engine control unit 8. The internal combustion engine 1 takes in the air required for combustion via an intake pipe or induction pipe 3. A throttle valve 2 is arranged in the induction pipe 3 which measures the appropriate setting of the air quantity. The throttle valve 2 is driven via lines (not shown in more detail) by the engine control unit 8.

At least one catalytic converter 6 is located in the exhaust gas tract 4 of the internal combustion engine 1. In order to operate the catalytic converter 6, there is provided upstream thereof a lambda probe 5 which outputs its measured values to the operating control unit 8 via lines which are not shown in more detail. Furthermore, the values of further measuring sensors, in particular for speed, load, catalyst temperature, etc., are fed to the operating control unit 8. The operating control unit 8 controls the operation of the internal combustion engine 1 with the aid of these measured values. The operating control unit 8 converts the signal of the lambda probe 5 into an assigned lambda value by means of a characteristic. In accordance with embodiments of the present invention, the operating control unit 8 receives signals indicating an overrun fuel cutoff condition, during which the output of a humidity sensor 9 is used to calibrate the output of the lambda probe 5. More particularly, the engine control unit 8 receives an air humidity value used to correct a lambda sensor calibration factor. As shown, the humidity sensor 9 may be positioned in the air intake duct, or it may be positioned in the air conditioning system or any other suitable point in the motor vehicle.

The humidity of the air aspirated by the internal combustion engine is determined as a basis for the aforesaid method for correcting the output signal of the broadband lambda probe. Said value for the air humidity is taken into account as part of a calibration factor of the characteristic curve of the broadband lambda probe in order to calibrate the characteristic curve of the broadband lambda probe during an overrun fuel cut-off phase of the internal combustion engine to the measured exhaust gas composition of clean air. As a result of the measuring of the humidity of the air it is taken into account in the calibration factor that the humidity stored in the aspirated air reduces the oxygen component of the aspirated air. In this way an increase in the accuracy of the broadband lambda probe is achieved which ensures a reduced discharge of harmful exhaust gases of the internal combustion engine.

According to another embodiment, the sensitivity of the broadband lambda probe to the air humidity is described by means of an air humidity factor and said air humidity factor is incorporated in the aforesaid calibration factor.

It is furthermore preferred to measure the air humidity by way of an air humidity sensor which is arranged, for example, in an engine air intake duct, an air conditioning system or elsewhere in the motor vehicle.

It is also conceivable to define the air humidity factor on the basis of manufacturer specifications which characterize the sensitivity of the broadband lambda probe used to humidity stored in the air. As a further alternative, a dependence of a measurement behavior of the broadband lambda probe on the humidity of the air is determined with selective modification of the air humidity in order to determine therefrom an air humidity factor or a function for the air humidity factor.

The accuracy of the output signal of a broadband lambda probe of an internal combustion engine is increased with the aid of the method according to an embodiment by comparison with the prior art. Broadband lambda probes are generally known and are available from different manufacturers.

An overrun fuel cut-off phase of the internal combustion engine is detected or specifically selected for the purpose of calibrating the broadband lambda probe. The exhaust gas composition of the internal combustion engine is subsequently measured with the aid of the broadband lambda probe during said overrun fuel cut-off phase. Since no combustion takes place in the overrun fuel cut-off phase, the air aspirated by the internal combustion engine can be evaluated with the aid of the broadband lambda probe. Said air has a known oxygen content of approx. 21%. In this way the actual measured value of the broadband lambda probe and consequently also its characteristic curve can be calibrated to the reference value of the oxygen content of 21%.

The calibration is implemented with the aid of a correction factor by means of which component tolerances, for example, and a drift of the measurement signal of the broadband lambda probe due to its aging are taken into account. The determination, form and function of said correction factor are described in depth in DE-A-198 42 425 C2, so reference is made to said document for further details of the calibration.

In the course of the calibration, tolerances of the broadband lambda probe that are caused by various influences are collectively taken into account with the aid of the calibration factor K. By way of example, several influences and the tolerances in the signal of the broadband lambda probe caused thereby are shown in the following table.

| Influence | Dependence $\Delta I_p/I_p$ | Unit | Error percentage in calibration factor |
|---|---|---|---|
| Air humidity | 1.50% | 1/10 hPa or 1/10 gH20 | 4.20% |
| Unburnt hydrocarbons | 2.50% | 1/1000 ppm | 1.50% |
| Function accuracy | 1.00% | | 1.00% |
| Temperature dependence of the pump current $I_p$ | 3.00% | 1/100K | 0.60% |
| Exhaust gas counterpressure | 6.00% | 1/100 hPa | 3.00% |
| Offset (for $I_p = 0$, $\Delta\lambda$) | 0.50% | | 0.50% |
| Standard tolerance $I_{p\ standard}$ | | | 5.5% |
| Total of tolerances | | | 10.80% |

The first column of the above table lists the variables which exert an influence on the signal of the broadband lambda probe. They include the air humidity, the proportion of unburnt hydrocarbons in the exhaust gases, the functional accuracy of the lambda probe, a temperature dependence of the pump current $I_p$ of the broadband lambda probe, the exhaust gas counterpressure, a general offset of the broadband lambda probe for a pump current of $I_p$=0. Said influencing variables cause variations in the pump current $I_p$ of the broadband lambda probe. Said variations are shown in the second column of the table. The third column contains the unit of the influencing variables listed in the first column in each case. The fourth column shows the error percentage that results due to the respective influencing variable based on the assumption of typical failure data for a typical diesel engine application in the already aforementioned calibration factor K.

It can be seen in the fourth column that the greatest error percentage is introduced into the calibration factor K due to the air humidity. In order to reduce said disruptive influence of the air humidity, a compensation model is applied to the above-described calibration factor K. The compensation model corrects the measurement signal or the characteristic curve of the broadband lambda probe as a function of a measured air humidity. As an exemplary embodiment the compensation model uses the signal of an air humidity sensor that is installed in the air conditioning system of motor vehicles, for example. Alternatively it is also conceivable to generate a signal that is representative of the air humidity with the aid of an air humidity sensor disposed in the air intake duct of the internal combustion engine or at another suitable point in the motor vehicle.

The error sensitivity of the broadband lambda probe as a function of the air humidity is described with the aid of a sensitivity factor or air humidity factor specified by the manufacturer of the broadband lambda probe. According to a further alternative, the dependence of a measurement behavior of the broadband lambda probe is first determined with selective modification of the air humidity and subsequently input as a functional relationship into the compensation model. If the compensation model is now applied to the above calibration factor K, the measurement error caused by the air humidity is quantitatively detected with the aid of the humidity specification and taken into account accordingly in the above-described calibration factor. This significantly increases the accuracy of the adaption of the broadband lambda probe from DE-A-198 42 425 C2, since with the exclusion of the humidity influence the parameter responsible for the highest error contribution is factored out.

The broadband lambda probe is preferably calibrated by way of the pump current $I_p$ of the broadband lambda probe. The above calibration factor K then calibrates the measured pump current $I_{p\ puc}$ during the overrun fuel cut-off phase of the internal combustion engine to a reference pump current $I_{p\ soll}$ in accordance with the oxygen concentration in the measured air. This relationship is shown in the following equation.

$$K = \frac{I_{p\ puc}}{I_{p\ soll}}$$

For the operation of the broadband lambda probe, the pump current $I_p$ is yielded as the quotient calculated from a measured pump current $I_M$ and the calibration factor K:

$$I_p = \frac{I_M}{K}$$

In order to reduce the error generated by the air humidity, the air humidity is taken into account during the calculation of the calibration factor K. This is achieved with the aid of the humidity factor $F_{Feuchte}$, which describes the sensitivity of the broadband lambda probe to the air humidity LF. For this reason the air humidity LF is determined prior to or during the overrun fuel cut-off phase of the internal combustion engine. In connection with the humidity factor $F_{Feuchte}$, the determined value for the air humidity LF is then included in the determination of the calibration factor K. This operation is preferably performed during or after the overrun fuel cut-off phase of the internal combustion engine in accordance with the equation:

$$K = \frac{I_{p\ puc} \cdot F_{Feuchte} \cdot LF}{I_{p\ soll}}$$

The negative influence of the air humidity LF is therefore minimized as a result of taking into account the humidity factor $F_{Feuchte}$. Without the air humidity factor, the standard tolerance of 5.5% (cf. above table) must be applied to the pump current $I_p$ of the broadband lambda probe. Consequently an error is propagated in the determined lambda value in accordance with said 5.5%. If the air humidity factor is taken into account, a new standard tolerance of the pump current $I_p$ is yielded which is reduced by the error contribution of 4.2% of the air humidity. This therefore results in a significantly reduced new standard tolerance of the broadband lambda probe of 3.6%. Since the error in the determination of the lambda value is significantly reduced with the aid of the broadband lambda probe based on the aforesaid method, the implementation of low emission concepts in modern internal combustion engines is likewise supported in this way.

Figure 2:
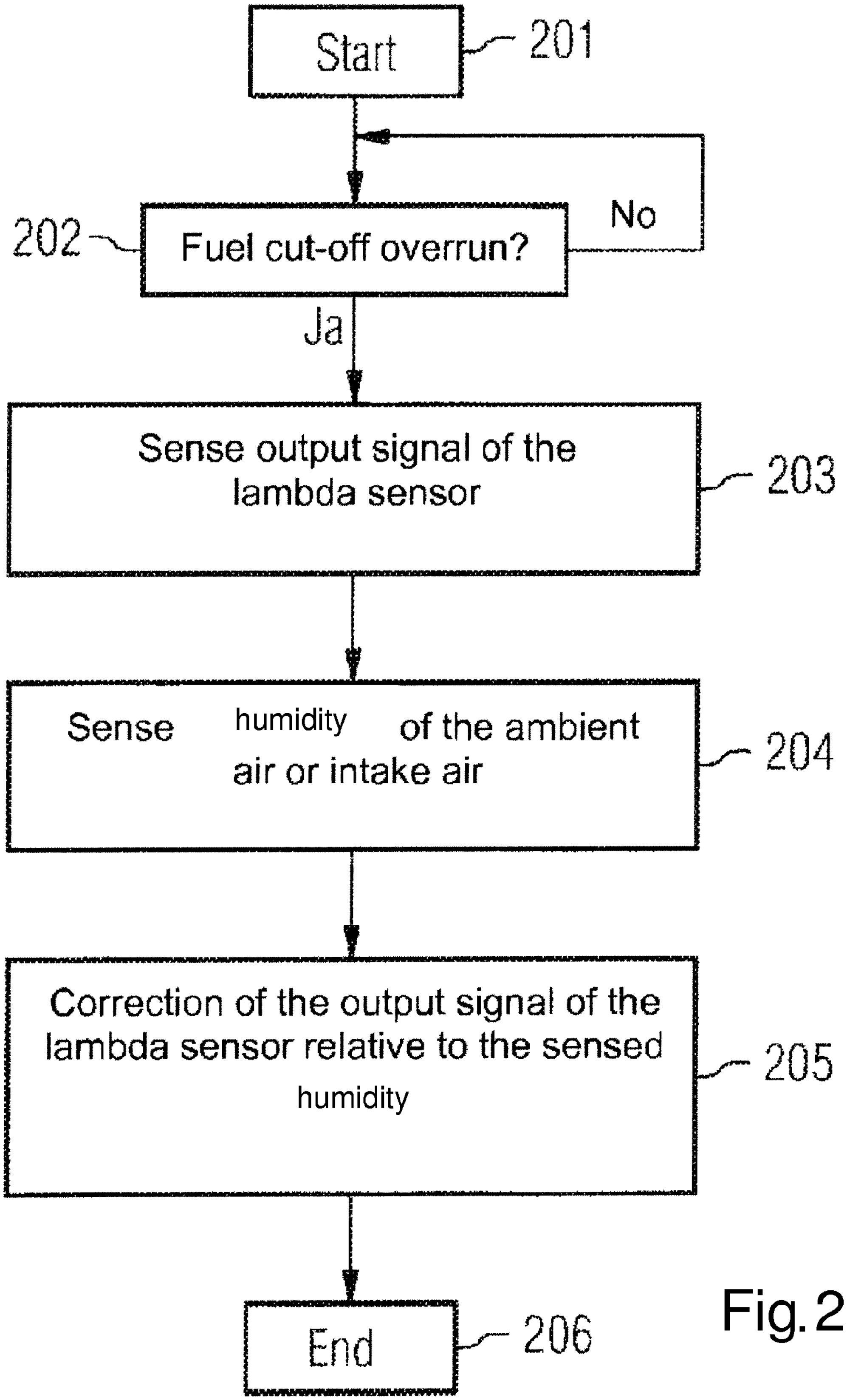
FIG. 2 is a flowchart illustrating operation of embodiments of the present invention.

An exemplary embodiment of a method for correcting the output signal of the lambda sensor 5 without providing an air humidity sensor is presented in the following. A flow diagram of the method is shown in FIG. 2.

After the start of the method in step 201, a check is first carried out in step 202 to determine whether the internal combustion engine 1 is in a fuel cut-off overrun phase. If a fuel cut-off overrun phase is detected, the output signal of the lambda sensor 5 is detected in a step 203. In step 204 the humidity of the ambient air, or alternatively of the intake air, is now sensed. Based on the output signal of the lambda sensor 5 and the sensed humidity, the lambda sensor 5 is now recalibrated in step 205. The method ends in step 206.

The invention claimed is:

1. A method for correcting the output signal of a broadband lambda probe of an internal combustion engine, said method comprising the following steps:

a) detecting an overrun fuel cut-off phase of the internal combustion engine and measuring of an exhaust gas composition with the aid of the broadband lambda probe such that the broadband lambda probe can be calibrated to a known exhaust gas composition, b) measuring the humidity of the ambient air of the internal combustion engine by way of an air humidity sensor in an air conditioning system of the internal combustion engine, and c) calculating a calibration factor of the broadband lambda probe taking into account the known exhaust gas composition and the measured air humidity wherein the calibration factor takes into account that humidity stored in aspirated air reduces an oxygen component of the aspirated air.

2. The method according to claim 1, comprising the further step:

describing of a sensitivity of the broadband lambda probe to the air humidity by means of an air humidity factor and incorporating the air humidity factor into the calibration factor.

3. The method according to claim 2, comprising the further step:

applying an air humidity factor in accordance with manufacturer specifications for the broadband lambda probe.

4. The method according to claim 2, comprising the further step:

determining a dependence of a measurement behavior of the broadband lambda probe with selective modification of the air humidity.

5. The method according to claim 1, comprising the further step:

measuring the air humidity by way of an air humidity sensor.

6. A device for correcting the output signal of a broadband lambda probe of an internal combustion engine, comprising:

a broadband lambda probe for measuring of an exhaust gas composition, means for detecting an overrun fuel cut-off phase of the internal combustion engine during which the broadband lambda probe is calibrated to a known exhaust gas composition, means for measuring the humidity of the ambient air of the internal combustion engine, the measuring means arranged in an air conditioning system of the internal combustion engine, and means for calculating a calibration factor of the broadband lambda probe taking into account the known exhaust gas composition and the measured air humidity;

wherein the calibration factor takes into account that humidity stored in aspirated air reduces an oxygen component of the aspirated air.

7. The device according to claim 6, further comprising:

means for describing of a sensitivity of the broadband lambda probe to the air humidity by means of an air humidity factor and means for incorporating the air humidity factor into the calibration factor.

8. The device according to claim 7, further comprising:

means for applying an air humidity factor in accordance with manufacturer specifications for the broadband lambda probe.

9. The device according to claim 7, further comprising:

means for determining a dependence of a measurement behavior of the broadband lambda probe with selective modification of the air humidity.

10. The device according to claim 6, further comprising:

a humidity sensor for measuring the air humidity.

* * * * *